US008024808B1

(12) United States Patent
Gleichauf

(10) Patent No.: US 8,024,808 B1
(45) Date of Patent: Sep. 20, 2011

(54) ARRANGEMENT FOR CONTROLLING CONTENT DISTRIBUTION BY DYNAMICALLY CONTROLLING BANDWIDTH FOR TRANSFER OF THE CONTENT BASED ON CONTENT AUTHORIZATION

(75) Inventor: Paul Harry Gleichauf, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 2397 days.

(21) Appl. No.: 10/212,689

(22) Filed: Aug. 7, 2002

(51) Int. Cl.
G06F 9/00 (2006.01)
G06F 21/24 (2006.01)
G06F 21/20 (2006.01)

(52) U.S. Cl. ............. 726/26; 726/11; 713/153; 713/165

(58) Field of Classification Search .................. None
See application file for complete search history.

(56) References Cited

U.S. PATENT DOCUMENTS

| | | | |
|---|---|---|---|
| 6,253,193 B1 | 6/2001 | Ginter et al. | |
| 6,438,666 B2* | 8/2002 | Cassagnol et al. | 711/163 |
| 6,473,793 B1* | 10/2002 | Dillon et al. | 709/223 |
| 6,529,475 B1* | 3/2003 | Wan et al. | 370/231 |
| 6,658,010 B1* | 12/2003 | Enns et al. | 370/401 |
| 6,781,991 B1* | 8/2004 | Anderlind | 370/394 |
| 6,904,265 B1* | 6/2005 | Valdivia et al. | 455/12.1 |
| 2002/0129140 A1* | 9/2002 | Peled et al. | 709/224 |
| 2002/0191573 A1* | 12/2002 | Whitehill et al. | 370/338 |
| 2003/0208621 A1* | 11/2003 | Bowman | 709/242 |
| 2004/0205208 A1* | 10/2004 | Koponen et al. | 709/230 |

FOREIGN PATENT DOCUMENTS

WO WO 0157869 A2 * 9/2001

OTHER PUBLICATIONS

Blake et al., "An Architecture for Differentiated Services", Dec. 1998, RFC 2475.*
Craver et al., "Reading Between the Lines: Lessons from the SDMI Challenge", Proceedings of the 10th USENIX Security Symposium, Aug. 13-17, 2001, The USENIX Association.
Product literature, "Packetshaper", www.packeteer.com/products/packetshaper, Apr. 23, 2002.
Gillmor, "Dan Gillmor: The technology behind Napster is far from dead", SiliconValley.com, May 15, 2002.
Technical Specifications, replaytv™ 4000, www.sonicblue.com, May 15, 2002.
Product literature, replaytv™ 4000, www.sonicblue.com, May 15, 2002.

* cited by examiner

*Primary Examiner* — Eleni Shiferaw
*Assistant Examiner* — Jeffery Williams
(74) *Attorney, Agent, or Firm* — Leon R. Turkevich

(57) ABSTRACT

A broadband network device is configured, in a broadband network, for dynamically controlling an upstream link bandwidth of a user node configured for downloading content via a downstream link having a prescribed bandwidth and uploading content through the broadband network via an upstream link according to the upstream link bandwidth. The broadband network device sets the upstream link bandwidth to a bandwidth value optimized for minimal-size data (e.g., message-based) transfers and that substantially restricts transfers of media-based (e.g., digital video or audio) data transfers to substantially long time intervals. The broadband network device is configured for dynamically increasing the upstream link bandwidth to an increased bandwidth value optimized for media-based data transfers, based on an identified authorization. The authorization may be supplied externally, for example, by a content provider, or based on a verification supplied by an authorization server that the user node is authorized to redistribute the content. Hence, content distribution can be controlled based on dynamically controlling the upstream link bandwidth according to content authorization, substantially minimizing the occurrences of unauthorized content redistribution.

43 Claims, 4 Drawing Sheets

ARRANGEMENT FOR CONTROLLING CONTENT DISTRIBUTION BY DYNAMICALLY CONTROLLING BANDWIDTH FOR TRANSFER OF THE CONTENT BASED ON CONTENT AUTHORIZATION

BACKGROUND OF THE INVENTION

1. Field of the Invention

The present invention relates to controlling network bandwidth of a user node in a broadband network and the protection of protected content, and more particularly to controlling redistribution of protected content such as copyrighted digital music, video, and the like.

2. Description of the Related Art

Broadband networks typically utilize asymmetric bandwidth allocation, where a network link from a user node at a customer premises to a network access server, also referred to an upstream link, has a substantially lower allocated upstream bandwidth than the corresponding downstream link from the network access server to the user node. Broadband networks typically provision bandwidth asymmetrically between the network access server and the user node based on an assumption that the upstream link will typically require less bandwidth than the downstream link. In particular, the upstream link typically will utilize relatively small-sized requests, for example, sending text-based HTTP requests to a web server or e-mail requests to an e-mail server, or sending e-mail messages, having sizes on the order of 10-200 kilobytes. In contrast, the downstream link typically is utilized by the user node for downloading digital content (e.g., application software, encoded audio, and/or video) stored in substantially larger data files, for example 10 megabytes (Mbytes) and above, often exceeding 100 Mbytes. For example, commercial Asymmetric Digital Subscriber Line (ADSL) providers may offer downstream rates up to 8 megabits per second (Mbps), whereas the upstream rate would typically have a maximum rate of 640 kbps.

Hence, any data can be delivered in the downstream link up to the allocated capacity, measured for example in terms of bandwidth. Any data can also be sent from the user node to a destination via the broadband network based on the capacity of the upstream link. In addition, certain protocol enhancements have been proposed to improve the quality of service for broadband content (e.g., broadband video services) by increasing bandwidth and/or minimizing latency. For example, broadband networks deployed using Asynchronous Transfer Mode (ATM) cell streams can partition bandwidth into "virtual circuits" to provide guaranteed quality of service. Broadband networks deployed using Internet Protocol (IP)-based networks may utilize the Resource Reservation Protocol (RSVP), established by the Internet Engineering Task Force (IETF) Resource Reservation Setup Protocol Working Group as Request for Comments (RFC) 2205, for setting up resource reservations in the Internet. In addition various proposals have been submitted to the IETF in an effort to provide improved Quality of Service in terms of optimizing delivery of broadband content.

A primary concern among service providers deploying broadband networks and content providers offering online media content (e.g., streaming video, video on demand, music on demand, e-books, etc.) involves the unauthorized distribution of content. In particular, data transmitted over the Internet is relatively unrestricted in that any user having access via a user node can distribute any data to any other computer. Hence, users can share files using peer-to-peer resources without providing royalty payments to content owners; such peer-to-peer resources have resulted in substantial enforcement efforts by copyright holders, as illustrated by lawsuits filed against Napster, Inc., Redwood City, Calif. by copyright holders.

Hence, substantial tensions arise between service providers and commercial content providers or content rights holders. In particular, the service providers offer data access services for users that enable the users to download, and potentially redistribute content. The content providers or content rights holders, however, are especially concerned about loss of royalty revenue due to unauthorized redistribution of copyrighted or licensed content after a commercial transaction involving payment by a user for content (e.g., a multi media file, streaming video, etc.). Although the content provider may require the user purchasing the content to agree to refrain from copying or redistributing the content, typically in the form of a licensing agreement, the content provider typically has limited means of enforcing the licensing agreement in a convenient manner. Note, however, that in peer-to-peer distribution models some receivers can elect to become secondary providers, owing a license payment from each redistribution point or receiver to the copyright holder. Such an arrangement, however, still does not guarantee payment of the royalty.

One proposal for limiting redistribution of content involves encryption, for example Secure Sockets Layer (SSL) connections between servers and user devices, to prevent eavesdroppers from obtaining contention information or associated transaction information without the necessary encryption key. The content itself also may be encrypted in the form of an encrypted media file, requiring the user to possess a decryption key which may be provided separately; such an arrangement, however, limits the flexibility of the user to utilize the encrypted content, for example if the user prefers to transfer the encrypted media file to another device within an associated home network. In addition, encrypted files require the ability to find the appropriate small-sized key when the relatively large-sized multimedia content object is used. If the key is lost, the user also loses the ability to access the content until someone determines how to "crack" the encryption cipher.

The restrictions imposed by encrypted media files also may be overcome by using MPEG encoder devices, for example the Replay TV 4000 commercially available from SONICblue, Inc., Santa Clara, Calif. Such MPEG encoder devices can encode and store decrypted content that has been recovered in the form of an analog video signal for display on a monitor. Hence, decrypted content can be re-encoded for storage and transfer to an unauthorized user via the upstream link.

Use of embedded markers within an analog signal to indicate evidence of ownership and limited permissions-to use, also known as watermarks, can be used to limit redistribution and trace transfers of protected content, assuming the necessary redistribution is in place to detect the markers. However, watermarks can be removed once their existence and form have been determined. Hence, once a watermark has been removed, the formerly protected content can be sent across the Internet without an audit trail that otherwise could be used to trace the protected content.

SUMMARY OF THE INVENTION

There is a need for an arrangement that enables content stored in a tangible media file to be controlled in a manner that ensures that unauthorized redistribution is minimized with little modification to existing broadband networks. In addition, there is a need for a more flexible arrangement that enables a range of fair use practices for tangible media files to be deployed, for example the transfer between devices on a local home network.

There also is a need for an arrangement in a broadband network device that enables unrestricted downloading of content to a user node via a broadband downstream link (i.e., egress network connection), while restricting the ability of the user node to redistribute, via an upstream link (i.e., ingress network connection), the content without providing content protection attributes that enables traceability of the content.

There is a further need for an arrangement that enables unrestricted downloading of content to a user node via a broadband downstream link, while selectively optimizing the ability of the user node to redistribute the content by transfer via an upstream link, based on selectively increasing the upstream link according to an identified authorization.

These and other needs are attained by the present invention, where a broadband network device is configured, in a broadband network, for dynamically controlling an upstream link bandwidth of a user node configured for downloading content via a downstream link having a prescribed bandwidth and uploading content through the broadband network via an upstream link according to the upstream link bandwidth. The broadband network device sets the upstream link bandwidth to a bandwidth value optimized for minimal-size data (e.g., message-based) transfers and that substantially restricts transfers of media-based (e.g., digital video or audio) data transfers to substantially long time intervals. The broadband network device is configured for dynamically increasing the upstream link bandwidth to an increased bandwidth value optimized for media-based data transfers, based on an identified authorization. The authorization may be supplied externally, for example, by a content provider, or based on a verification supplied by an authorization server that the user node is authorized to redistribute the content. Hence, content distribution can be controlled based on dynamically controlling the upstream link bandwidth according to content authorization, substantially minimizing the occurrences of unauthorized content redistribution.

One aspect of the present invention provides a method in a broadband network device configured for providing an ingress network connection to a user node in a broadband network. The method includes configuring the ingress network connection to a first data rate that substantially restricts transfer of a media data file. The method also includes selectively setting the ingress network connection, for a prescribed interval, to a second data rate enabling unrestricted transfer of the media data file, based on a determined content protection attribute associated with the transfer by the user node Another aspect of the present invention provides an a broadband network device configured for providing an ingress network connection to a user node in a broadband network. The broadband network device includes a network interface configured for establishing the ingress network connection with the user node at a selected data rate, and a processor. The processor is configured for selecting the selected data rate to a first data rate that substantially restricts transfer of a media data file. The processor also is configured for selectively changing the selected data rate from the first data rate to a second data rate for a prescribed interval based on a determined content protection attribute associated with the transfer of the media data file by the user node, the second data rate enabling unrestricted transfer of the media data file.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
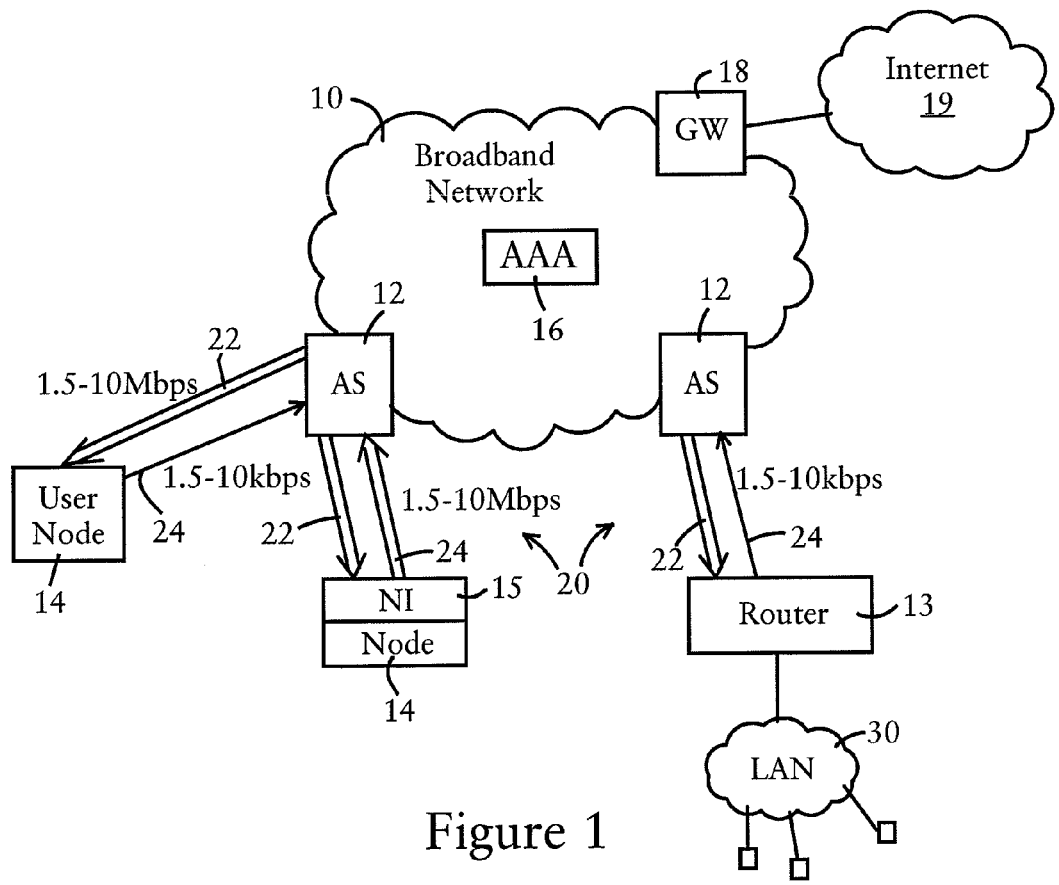
FIG. 1 is a diagram illustrating a broadband network having broadband network devices configured for controlling content redistribution by selectively restricting transfer of media data files by user nodes, according to an embodiment of the present invention.

FIG. 1 is a diagram illustrating a broadband network 10 having broadband network devices, for example access servers (AS) 12, routers 13, or broadband network interface (NI) devices 15, having bandwidth control resources configured for controlling content redistribution by user nodes 14 based on controlling upstream connection data rates, according to an embodiment of the present invention. The broadband network 10, implemented for example as a high speed broadband content network deployed by an Internet Service Provider (ISP) for residential premises, business consumers, and the like, includes access servers 12, at least one authorization server 16, and a gateway server 18. The gateway server 18 is configured for establishing an interface between the broadband network 10 and a wide-area network 19 such as the Internet. The authorization server 16 is configured for providing content authorization information to the access servers 12, described below.

Each user node 14, for example a computer at a customer premises, is coupled via a local distribution network 20 to the broadband network 10. The local distribution network 20 may be implemented, for example, as a fiber to the home distribution network, a T1 connection for a business premises, a wireless broadband link, a cable headend aggregation point, etc. As described below, the bandwidth control resources used to control content redistribution by controlling upstream connection data rates may be implemented at the customer premises (e.g., within a multi-layer network switch (not shown) within the LAN 30, within the router 13 at the customer premises, or the network interface 15), or at the service providers location (e.g., the access server 12). Hence, the disclosed bandwidth control resources may be embedded within a broadband network device at the customer premises, even though the bandwidth control resources remain under control by either the service provider or content owner as described below.

For ease of discussion, the bandwidth control resources will be described with reference to implementation within the access server 12; however it will become readily apparent that the disclosed bandwidth control resources also can be implemented in the router 13, the network interface 15, a network switch, etc., or any other device capable of controlling a bandwidth connection between a user node 14 and a destination network node.

Each broadband network device having the bandwidth control resources is configured for establishing a downstream broadband network connection and an upstream network connection. In the case of the access server 12, the access server 12 is configured for establishing a downstream broadband connection 22 and an upstream network connection 24. The downstream broadband connection 22, also referred to as an egress network connection, serves as an egress point for broadband data from the broadband network 10 to the corresponding user node 14.

The downstream broadband connection 22 is assigned by the corresponding broadband network device (e.g., the access server 12) a maximum egress data rate (e.g., bandwidth rate) based on existing network capacity and existing traffic management procedures, enabling unrestricted transfer of media data to the corresponding user node 14, independent of bandwidth allocation operations associated with the upstream network connection 24, described below. Hence, the downstream broadband connection 22 is assigned a maximum bandwidth rate based on network capacity, traffic management, and contracted service levels, for example on the order of 1.5 to 10 Mbps. Other data rates may be used depending on implementation, for example 1 Gbps for Gigabit Ethernet connections, or higher. Note that the term "egress point" and "ingress point" is relative to the broadband network device having the bandwidth control resources.

According to the disclosed embodiment, upstream connections 24 are assigned by the broadband network device controlling the connection a "fast" data rate for certified user applications or user content having determined content protection attributes (e.g., certificates, etc.) indicating the user is authorized to perform the data transfer. In the case of an "insecure application" (i.e., where no indicia of content ownership or authorization has been exchanged between the user node 14 and the broadband network device), the upstream connection 24 is set to a lower, "default" data rate, described in detail below. Note that the content protection attributes (e.g., a PKI based X.509 certificate, Kerberos ticket, etc.) may be stored at the user node 14, the broadband network device, or a content server (e.g., a content provider).

Figure 2A:
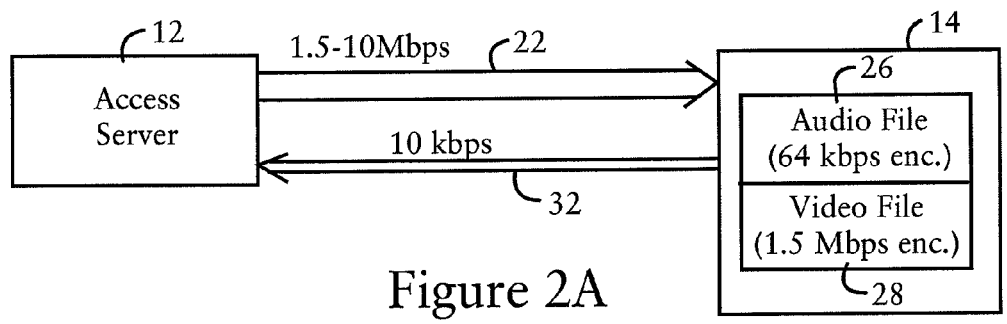
FIGS. 2A and 2B are diagrams illustrating a default upstream network connection configured for substantially restricting transfer of a media data file and a dynamically allocated upstream network connection having a substantially higher bandwidth for a prescribed interval to enable unrestricted transfer of a media data file, respectively, according to an embodiment of the present invention.
Figure 2B:
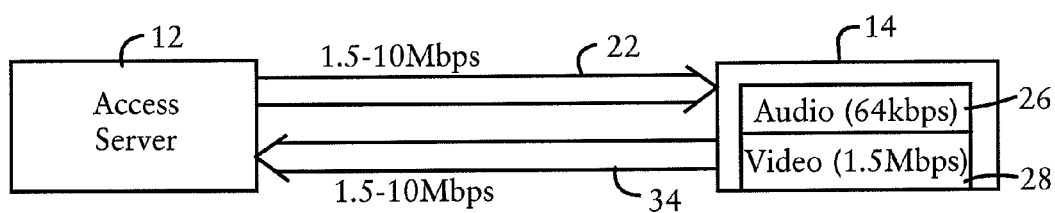

As illustrated in FIG. 2A, the upstream connection 24 is assigned a default data rate (i.e., bandwidth rate) 32 that is optimized for minimal-size data transfers, for example server requests according to existing web protocols (e.g., HTTP) and e-mail protocols (e.g., POP3, IMAP), and text-based e-mail messages, on the order of 1.5 to 10 kbps. The maximum default data rate of 10 kbps assumes that the user node 14 serves as an interface for Voice over IP services, which may require 10 kbps data rates for 8 kbps-encoded Voice over IP media streams. Note that different default rates may be used based on respective application signatures, where an e-mail application receives one rate, an e-mail attachment receives another rate, a file transfer protocol (ftp) application receives another rate, etc.

Hence, the default data rate 32 is set to a sufficiently low level to allow transfer of basic server requests and e-mail messages having relatively small MIME attachments from the user node 14 to the broadband network 10 for insecure applications. Note, however, that the default data rate 32 substantially restricts transfer of media data files 26, 28 that require a higher-speed broadband connection. For example, compact disc (CD) quality media players such as the commercially available Windows Media Player from Microsoft, Inc., typically require a minimum of 64 kbps bit rates for playing an audio file 26, stored as a .wav file or a file on an audio CD. Moreover, media players typically require a minimum of 28 MB of disk storage for compressed audio data encoded at a 64 kbps bit rate; higher quality audio encoding may require even higher amounts of disk storage. Consequently, any efforts by a user node 14 to transfer a media data file via an upstream network connection 24 (for example a peer to peer transfer between user nodes 14a and 14b) would require a user to endure a substantially long time interval to receive the lowest quality audio file (using the example above, a user node 14a attempting to transfer a 28 MB audio file from the user node 14b would need to wait approximately 45 minutes for transfer via the 10 kbps upstream connection 24. Video files 28 use substantially higher encoding rates, for example 1.5 to 6 Mbps encoding for MPEG-encoded video streams.

Hence, the inventor has realized that users attempting to share media files 26 or 28, for example audio CDs or DVDs via a broadband network 10, typically will lose interest in attempting to transfer files as the transfer time substantially exceeds the play duration for the media data file. Hence, although users can still transfer large media files anonymously, users eventually stop attempting to illicitly transfer files due to the substantially long transfer times, especially if several hours are needed to transfer large data files.

Hence, unauthorized redistribution of protected content can be implemented effectively and economically by broadband service providers based on requiring a user to provide some form of a content protection attribute any time the user supplies a request for an increase in the ingress network connection data rate (i.e., upstream bandwidth) to a higher-bandwidth upstream connection 34 to accommodate an efficient transfer of a large sized media file 26 or 28 or a media stream connection. The request for an increase in upstream bandwidth must include a determined content protection attribute associated with the transfer of the media data file by the user node 14, for example a digital representation of an authorization to redistribute the content, such as licensing key, or an ownership certificate. Absent a digital representation of an authorization to redistribute, the access server 12 may request a content protection attribute in the form of a verification by the user of the user node claiming authorization for the unrestricted transfer.

Hence, use of the term "content protection attribute" refers to an indicium that may be stored and read to and/from a tangible computer readable medium (e.g., hard disk, EPROM, CD-ROM), or transmitted via a tangible transmission medium (e.g., cable, wireless propagation signal, etc.), and that specifies an attribute related to the user device having an authorization to distribute the content and that enables the transfer of the content to be traced back to the user device. As apparent from above, the content protection attribute may be implemented based on a user of the user node 14 supplying a statement that he/she is authorized to transfer the content.

Once the necessary content protection attribute has been received from the user node 14, the access server 12 logs the content protection attribute, increases the upstream connection bandwidth to a high-bandwidth upstream connection 34 (e.g., 1.5 to 10 Mbps), enabling unrestricted transfer of the media data file, and monitors the transfer metrics associated with the unrestricted transfer for any necessary auditing operations. If the content protection attributes have not been received, the default upstream bandwidth is maintained, enabling the user to transfer the data at the default data rate, if the user so desires.

Hence, deployment of an upstream bandwidth controller at the edge of the broadband network 10 enables the efficient control of content distribution by substantially restricting unauthorized transfers of the media data file to substantially small bandwidth connections, for example on the order of 10 kbps. In addition, the disclosed embodiment enables a user node 14 at a customer premises to freely distribute the content within its own premises, for example within a local area network 30. However, any attempt to redistribute the content back into the broadband network 10 requires that the user node 14 supply a content protection attribute before upstream bandwidth is increased to allow unrestricted transfer of the media data file. The increased upstream bandwidth 34 is preferably set at a value substantially at the encoding rate, for example 64 kbps for the audio file 26 or 1.5 Mbps, 6 Mbps, or up to 10 Mbps for the high-quality MPEG encoded digital video file 28.

Figure 3:
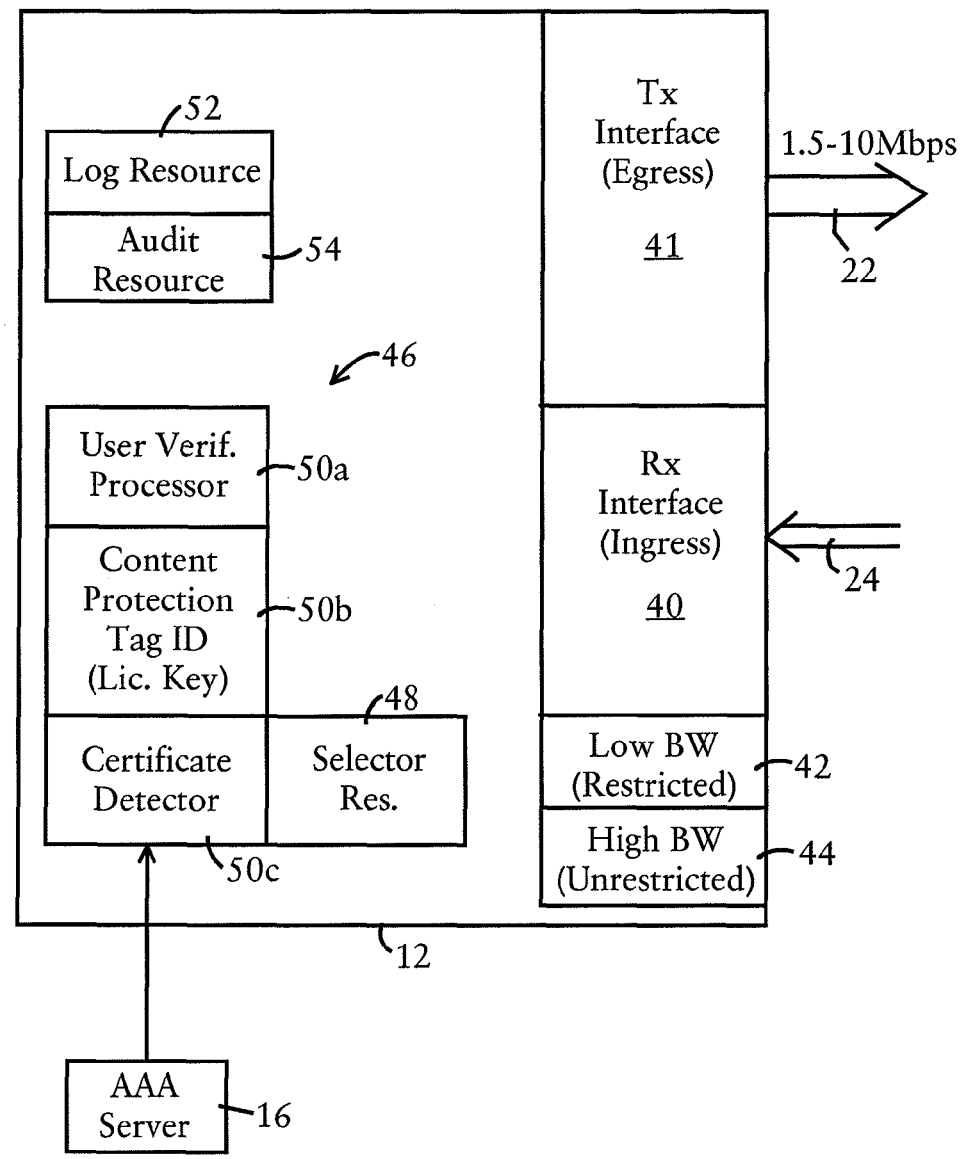
FIG. 3 is a block diagram illustrating the broadband network device of FIG. 1.

FIG. 3 is a block diagram illustrating in detail one embodiment of a broadband network device, implemented in the form of the access server 12, according to an embodiment of the present invention. The access server 12 includes an upstream network interface 40 having a default (low bandwidth) configuration 42 for implementing the low bandwidth connection 32 that substantially restricts transfers of media data files, and a high bandwidth configuration 44 for implementing the high bandwidth connection 34 that enables the unrestricted transfer of media data files. The upstream network interface 40 is controlled by a processor portion 46 having a selector resource 48, and content protection attribute detectors 50.

Different types of content protection attribute detectors 50 may be implemented depending on the type of content protection attribute being utilized. For example, the processor portion 46 may include a user verification processor 50a configured for requesting a user verify that he or she has authorization to unrestricted transfer of a media file, for example in the form of the user completing an HTTP form: note that the user verification processor 50a need not actually verify authenticity, but merely that the user node 14 states (for purposes of an audit trail) that the user node 14 has such authorization.

A licensing key identifier 50b and/or ownership certificate detector 50c may be utilized for detecting, within the media data file, whether a licensing key and ownership certificate are included within the media file, for example within headers prepended to the media content; in such cases, increased bandwidth 34 may be automatically allocated in response to receiving header information that specifies a bandwidth increase request, followed by either a licensing key or ownership certificate, eliminating the necessity for manual user intervention. Another example of automatic ownership detection by the detectors 50b and/or 50c may include detecting a registered application sending a request having prescribed attributes (e.g., a prescribed IP address, a prescribed machine address such as serial number or IEEE 802 media access control (MAC) address).

The processor portion 46 also is configured for accessing an authentication server 16, implemented for example as an Authentication, Authorization, and Accounting (AAA) server, in the event that content protection attributes associated with the user node 14 and/or the media file may be cached therein, for example in the case of a content provider or a licensed distribution company.

The access server 12 also includes a logging resource 52 configured for logging of the received content protection attributes and transfer metrics associated with the unrestricted transfer (e.g., transfer duration and/or transfer size in terms of bytes transferred). The log generated by the log resource 52 may be analyzed later by an audit resource 54 within the access server 12 to determine whether any inconsistencies are detected between the content protection attributes and the unrestricted transfer, for example if a media file expected to require only 50 Mbytes of transfer actually resulted in a 500 Mbytes file transfer, indicating an unauthorized transfer. The logging also can be used to encourage peer-to-peer licensed redistribution, since the request for authorized distribution can be authenticated, and messages can be sent to a content rights owner for royalty payments derived from redistribution rights.

As another example, if the application protocol requires the application to supply a unique transaction ID and additional signatures for the content file to be transferred, such as a file length, then the authentication server can wait until the broadband network device (e.g., the switch) verifies the signature (e.g. that the application has used up its length attribute allowance). If additional bits with the same tag continue to stream through the switch, then an alarm can be triggered for inspection of the log and traceback.

Figure 4A:
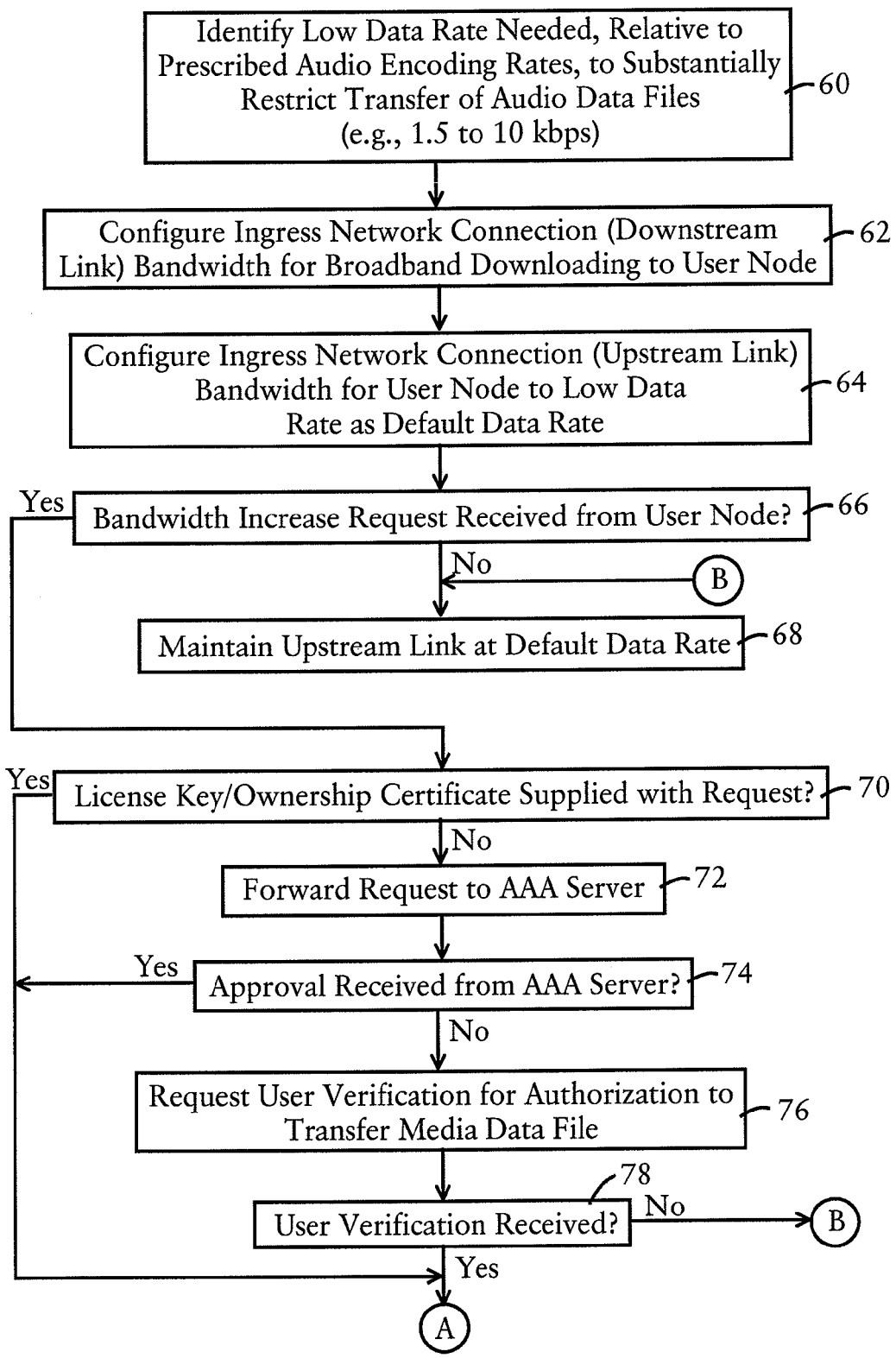
FIGS. 4A and 4B are diagrams summarizing the method of controlling content distribution by dynamically controlling the upstream network connection bandwidth based on determined content protection attributes, according to an embodiment of the present invention.
Figure 4B:
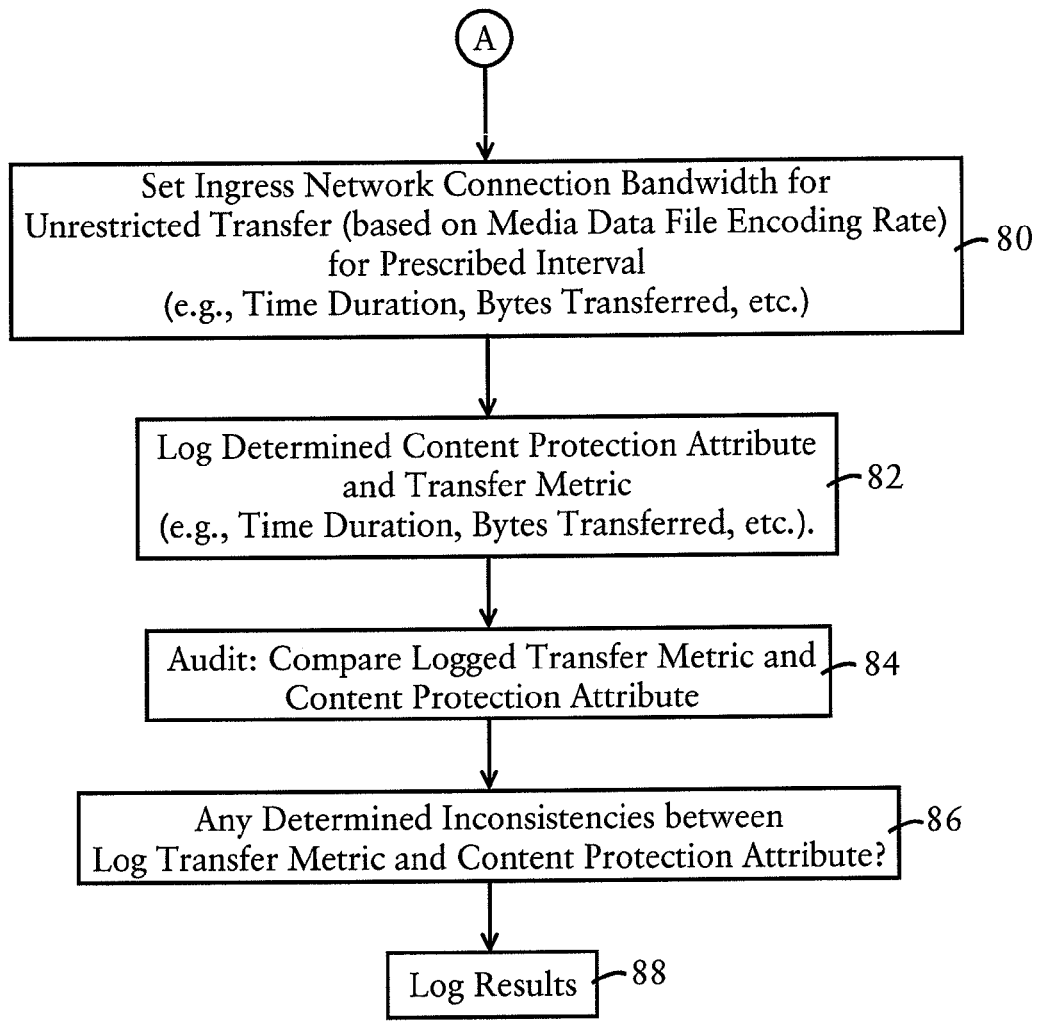

FIGS. 4A and 4B are diagrams summarizing the method of controlling content redistribution by dynamically controlling content distribution based on content authorization, according to an embodiment of the present invention. The steps described in FIGS. 4A and 4B can be implemented as executable code stored on a computer readable medium (e.g., a hard disk drive, a floppy drive, a random access memory, a read only memory, an EPROM, a compact disk, etc.).

The method begins in step 60, where a low default data rate 32 is predetermined, for example relative to known audio encoding rates, that is able to substantially restrict transfer of audio data files. The processor 46 then provisions the downstream link interface 40 to a prescribed downstream link bandwidth 22 for broadband access, independent of the upstream link 24.

The selector resource 48 within the processor 46 configures in step 64 the upstream link bandwidth for the low data rate 32 as the default data rate 42, enabling the user node 14 to send data anonymously and without any authorization, into the broadband network 10 via the upstream connection 24 at the low data rate 32.

If in step 66 no bandwidth increase is requested, the upstream link 24 is maintained at the low-bandwidth default data rate 32 in step 68. However if in step 68 the processor portion 46 detects a bandwidth increase request from the user node 14, components of the processor portion 46 determine the presence of any associated content protection attributes associated with the transfer by the user node 14.

For example, the content protection tag identifier 50b determines in step 70 whether a licensing key is supplied, and the certificate detector 50c determines in step 70 whether an ownership certificate was supplied with the request. If no such content protection attribute was received in step 70, the processor portion 46 forwards the request to the authentication server 16 in step 72. If in step 74 an approval response is not received from the authorization server 16, the user verification processor 50a requests in step 76 for user verification that he/she is authorized to transfer the media data file. The user verification processor 50a then determines in step 78 whether user verification is received, for example within a prescribed time interval during an authentication session.

If the processor portion receives any one of the above-described authorized content protection attributes associated with the transfer of the media data file by the user node 14, as described above with respect to steps 70, 74, and 78, the selector resource 48 increases the upstream bandwidth to the high-bandwidth data rate 44 to provide a high-rate upstream connection 34 in step 80, illustrated with respect to FIG. 4B. If no content protection attribute is received, the upstream link is maintained at the default data rate 42 in step 68.

Referring to FIG. 4B, once the upstream connection 24 has been set to a high bandwidth connection 34 in step 80, the log resource 52 logs the determined content protection attributes and the transfer metrics associated with the data transfer via the high bandwidth upstream link 34. The audit resource 54 can later compare in step 84 the log transfer metrics and the content protection attributes and analyze in step 86 whether any inconsistencies are detected between the log transfer metrics and the content protection attributes. The results of the audit procedure by the audit resource 54 can then be logged in step 88 for traceability.

According to the disclosed embodiment, unauthorized content redistribution can be effectively controlled by limiting upstream bandwidth data rates to substantially low data rate values that substantially restrict the transfer of media data files. Although the substantially low-bandwidth upstream connection 32 to not actually prevent a person who is determined to utilize the low-bandwidth upstream connection 32 for data transfers lasting substantially long time intervals (e.g., hours), the substantially long time intervals that would be necessary to transmit large data files on a relatively small bandwidth connection serves to deter most users from engaging in unauthorized content redistribution. The low bandwidth distribution also permits "advertising" of higher quality content in the form of a short trailer or a low quality rendering.

The disclosed arrangements also can be used in conjunction with other content protection schemes, including endpoint based encryption encoding and user device decryption, without any alteration in the existing systems other than the use of secure certificate properties. Consequently, if a large encrypted file was to be transferred without a trusted credential, the broadband network device would consider the file transfer as unauthorized and limit transfer according to the default bandwidth.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a broadband network device configured for providing an ingress network connection for a user node to send data into a broadband network, the method comprising:
   configuring, by the broadband network device, the ingress network connection to a default data rate having a first data rate that substantially restricts transfer of a media data file into the broadband network by the user node; and
   selectively setting the ingress network connection, by the broadband network device and for a prescribed interval, from the default data rate to a second data rate enabling unrestricted transfer of the media data file into the broadband network by the user node, based on a determined content protection attribute associated with the media data file and the transfer of the media data file by the user node.

2. The method of claim 1, further comprising determining, in response to a request received from the user node, the content protection attribute based on at least one of a content protection identifier within the media file, a supplied ownership certificate, and a verification by a user of the user node claiming authorization for the unrestricted transfer.

3. The method of claim 2, further comprising logging the content protection attribute, and a transfer metric associated with the unrestricted transfer.

4. The method of claim 3, further comprising comparing the transfer metric and the content protection attribute for detection of any inconsistency between the unrestricted transfer and the determined content protection attribute.

5. The method of claim 3, wherein the transfer metric includes one of a transfer duration and a transfer size.

6. The method of claim 2, wherein the determining step includes obtaining the content protection attribute from an authorization server.

7. The method of claim 2, wherein the determining step includes detecting, as the content protection identifier, a licensing key within the media data file.

8. The method of claim 1, wherein the first data rate is about 10 kbps.

9. The method of claim 8, wherein the second data rate is about 10 Mbps.

10. The method of claim 1, further comprising providing an egress network connection, concurrently with the ingress network connection, at a maximum egress data rate enabling unrestricted transfer of media data to the user node, independent of the configuring and selectively setting steps.

11. The method of claim 1, wherein:
   the configuring step includes setting the first data rate to substantially restrict the transfer to a time interval substantially exceeding a prescribed play duration for the media data file, based on the first data rate being substantially less than a prescribed encoding rate for media data stored in the media data file; and
   the selectively setting step includes setting the second data rate enabling the unrestricted transfer of the media data file substantially at the prescribed encoding rate.

12. A broadband network device configured for providing an ingress network connection for a user node to send data into a broadband network, the broadband network device comprising:
   a network interface configured for establishing the ingress network connection with the user node for sending of data by the user node into the broadband network at a selected data rate; and
   a processor configured for selecting the selected data rate to a default data rate having a first data rate that substantially restricts transfer of a media data file into the broadband network by the user node, the processor configured for selectively changing the selected data rate from the default data rate at the first data rate to a second data rate for a prescribed interval based on a determined content protection attribute associated with the media data file and the transfer of the media data file by the user node, the second data rate enabling unrestricted transfer of the media data file into the broadband network by the user node.

13. The broadband network device of claim 12, wherein the processor is configured for determining, in response to a request received from the user node, the content protection attribute based on at least one of a content protection identifier within the media file, a supplied ownership certificate, and a verification by a user of the user node claiming authorization for the unrestricted transfer.

14. The broadband network device of claim 13, further comprising a logging resource configured for logging the content protection attribute, and a transfer metric associated with the unrestricted transfer.

15. The broadband network device of claim 14, further comprising an audit resource configured for comparing the transfer metric and the content protection attribute for detection of any inconsistency between the unrestricted transfer and the determined content protection attribute.

16. The broadband network device of claim 14, wherein the transfer metric includes one of a transfer duration and a transfer size.

17. The broadband network device of claim 13, wherein the processor is configured for obtaining the content protection attribute from an authorization server.

18. The broadband network device of claim 13, wherein the processor is configured for detecting a licensing key within the media data file as the content protection identifier.

19. The broadband network device of claim 12, wherein the first data rate is about 10 kbps.

20. The broadband network device of claim 19, wherein the second data rate is about 10 Mbps.

21. The broadband network device of claim 12, wherein the processor is configured for:
   setting the first data rate to substantially restrict the transfer to a time interval substantially exceeding a prescribed play duration for the media data file, based on the first data rate being substantially less than a prescribed encoding rate for media data stored in the media data file; and
   setting the second data rate enabling the unrestricted transfer of the media data file substantially at the prescribed encoding rate.

22. A non-transitory computer readable medium having stored thereon sequences of instructions for providing an ingress network connection by a broadband network device for a user node to send data into a broadband network, the sequences of instructions including instructions for performing the steps of:
   configuring, by the broadband network device, the ingress network connection to a default data rate having a first data rate that substantially restricts transfer of a media data file into the broadband network by the user node; and
   selectively setting the ingress network connection, by the broadband network device and for a prescribed interval, from the default data rate to a second data rate enabling unrestricted transfer of the media data file into the broadband network by the user node, based on a determined content protection attribute associated with the media data file and the transfer of the media data file by the user node.

23. The medium of claim 22, further comprising instructions for performing the step of determining, in response to a request received from the user node, the content protection attribute based on at least one of a content protection identifier within the media file, a supplied ownership certificate, and a verification by a user of the user node claiming authorization for the unrestricted transfer.

24. The medium of claim 23, further comprising instructions for performing the step of logging the content protection attribute, and a transfer metric associated with the unrestricted transfer.

25. The medium of claim 24, further comprising instructions for performing the step of comparing the transfer metric and the content protection attribute for detection of any inconsistency between the unrestricted transfer and the determined content protection attribute.

26. The medium of claim 24, wherein the transfer metric includes one of a transfer duration and a transfer size.

27. The medium of claim 23, wherein the determining step includes obtaining the content protection attribute from an authorization server.

28. The medium of claim 23, wherein the determining step includes detecting, as the content protection identifier, a licensing key within the media data file.

29. The medium of claim 22, further comprising instructions for performing the step of providing an egress network connection, concurrently with the ingress network connection, at a maximum egress data rate enabling unrestricted transfer of media data to the user node, independent of the configuring and selectively setting steps.

30. The medium of claim 22, wherein:
   the configuring step includes setting the first data rate to substantially restrict the transfer to a time interval substantially exceeding a prescribed play duration for the media data file, based on the first data rate being substantially less than a prescribed encoding rate for media data stored in the media data file; and
   the selectively setting step includes setting the second data rate enabling the unrestricted transfer of the media data file substantially at the prescribed encoding rate.

31. A broadband network device configured for providing an ingress network connection for a user node to send data into a broadband network, the broadband network device comprising:
   means for configuring the ingress network connection to a default data rate having a first data rate that substantially restricts transfer of a media data file into the broadband network by the user node; and
   means for selectively setting the ingress network connection, for a prescribed interval, from the default data rate to a second data rate enabling unrestricted transfer of the media data file into the broadband network by the user node, based on a determined content protection attribute associated with the media data file and the transfer of the media data file by the user node.

32. The broadband network device of claim 31, further comprising means for determining, in response to a request received from the user node, the content protection attribute based on at least one of a content protection identifier within the media file, a supplied ownership certificate, and a verification by a user of the user node claiming authorization for the unrestricted transfer.

33. The broadband network device of claim 32, further comprising means for logging the content protection attribute, and a transfer metric associated with the unrestricted transfer.

34. The broadband network device of claim 33, further comprising means for comparing the transfer metric and the content protection attribute for detection of any inconsistency between the unrestricted transfer and the determined content protection attribute.

35. The broadband network device of claim 33, wherein the transfer metric includes one of a transfer duration and a transfer size.

36. The broadband network device of claim 32, wherein the determining means is configured for obtaining the content protection attribute from an authorization server.

37. The broadband network device of claim 32, wherein the determining means is configured for detecting, as the content protection identifier, a licensing key within the media data file.

38. The broadband network device of claim 31, further comprising means for providing an egress network connection, concurrently with the ingress network connection, at a maximum egress data rate enabling unrestricted transfer of media data to the user node and independent of the ingress network connection.

39. The broadband network device of claim 31, wherein:
the configuring means is configured for setting the first data rate to substantially restrict the transfer to a time interval substantially exceeding a prescribed play duration for the media data file, based on the first data rate being substantially less than a prescribed encoding rate for media data stored in the media data file; and
the selectively setting means is configured for setting the second data rate enabling the unrestricted transfer of the media data file substantially at the prescribed encoding rate.

40. The method of claim 1, wherein the content protection attribute identifies the user node having an authorization to distribute the media data file and that enables the transfer of the media data file to be traced back to the user node.

41. The broadband network device of claim 12, wherein the content protection attribute identifies the user node having an authorization to distribute the media data file and that enables the transfer of the media data file to be traced back to the user node.

42. The medium of claim 22, wherein the content protection attribute identifies the user node having an authorization to distribute the media data file and that enables the transfer of the media data file to be traced back to the user node.

43. The broadband network device of claim 31, wherein the content protection attribute identifies the user node having an authorization to distribute the media data file and that enables the transfer of the media data file to be traced back to the user node.

\* \* \* \* \*